3,294,492
PROCESS FOR DECLADDING ZIRCONIUM FROM ZIRCONIUM CLAD NUCLEAR FUEL ELEMENTS
Charles B. Bartlett, West Islip, Edward Wirsing, Jr., Mattituck, and Loranus P. Hatch, Brookhaven, N.Y., assignors to the United States of America as represented by the United States Atomic Energy Commission
No Drawing. Filed Feb. 11, 1966, Ser. No. 527,383
2 Claims. (Cl. 23—324)

The invention described herein was made in the course of, or under a contract with the U.S. Atomic Energy Commission.

This application relates to a process of separating zirconium from a zirconium clad body. More particularly it relates to a process for the separation of zirconium cladding from the core of a nuclear fuel element.

Nuclear fuel elements having fissile fuel bearing cores clad with zirconium are widely used in commercial power reactors. In the normal course of events after such zirconium clad elements have been used in a reactor for a predetermined length of time they are replaced. The spent fuel elements are then reprocessed to recover the fissile fuel contained therein. In the reprocessing procedures the cladding must be removed from the fuel element or otherwise dissolved or disintegrated in order that the fissile fuel contained in the core will be exposed for recovery.

Among the proposed processes used in the removal of the zirconium from the core of a fuel element is a process known as the "Zirflex Process." This process involves the use of nitric acid to dissolve the zirconium cladding. It has an advantage in that it results in a greatly reduced volume of radioactive waste which must be permanently stored. However, the "Zirflex Process" has one great disadvantage, it has a high corrosive action on containers. This has been a limiting factor for the extensive use of this process. Conventional container vessels when tested for use in the proposed "Zirflex Process" have been found to corrode and crack within a short period of time thus rendering the process uneconomical.

It is an object of this invention to provide an efficient economical process for removal of zirconium from zirconium clad bodies.

Another object of this invention is to provide an efficient, economical process for the decladding of zirconium from zirconium clad nuclear fuel elements.

A further object of this invention is to provide an efficient, economical process for recovering fissile fuel from zirconium clad nuclear fuel elements wherein the clad element is decladded and thereafter the fertile fuel is recovered, with the decladding and recovery operations being carried out in the same reactor vessel.

Other objects of this invention will be obvious, and will in part appear hereinafter.

We have unexpectedly discovered a process for removing zirconium cladding from zirconium clad uranium bearing nuclear fuel elements comprising, immersing the zirconium clad nuclear fuel element in a fluidized bed, said bed being made up of inert granular solids, said bed solids being fluidized by the passage of a gaseous fluidizing medium composed of from about 20 to about 90 volume percent oxygen based on the total volume of the fluidizing medium and from about 10 to about 80 volume percent hydrogen fluoride based on the total volume of the fluidizing medium while maintaining the temperature of said bed at a temperature ranging from about 500° C. to about 800° C. until the uranium contained in said element is exposed; fluidizing said bed and intimately contacting and reacting said exposed uranium with gaseous fluorine while maintaining the temperature of said bed at a temperature ranging from about 400° C. to about 450° C. until the uranium in said bed is reacted with fluorine, thereafter recovering the uranium from the reaction product of uranium and fluorine gas.

We have found the decladding stage of our novel process is ideally suited to and preferentially carried out in a fluidized bed with the bed made up of particulate aluminum oxide being fluidized by a gaseous medium composed of about 40 volume percent hydrogen fluoride and 60 volume percent oxygen, said volume percents being based on the total volume of fluidizing medium employed to effectuate the desired degree of decladding while maintaining the temperature of the bed at a temperaure of about 625° C. The use of fluidized beds per se is well known to those skilled in the art and need not be explained or further elaborated upon in this application except for those explanations given herein to more adequately explain our invention.

In the preferred embodiment of our invention, zirconium clad bodies such as zirconium clad uranium bearing nuclear fuel elements are immersed in a fluidized bed, whose bed portion contains aluminum oxide particles which aluminum oxide particles are all capable of passing through a 40 mesh/inch screen, ⅔ by weight of the particles being incapable of passing through a 90 mesh/inch screen and none of the aluminum oxide particles being capable of passing through a 120 mesh/inch screen. Thereafter fluidizing the bed and intimately contacting the element immersed therein with the gaseous oxygen hydrogen fluoride decladding mixture while regulating the bed at a temperature above about 625° C. until the desired degree of decladding is achieved. In general it has been found preferable to fluidize the particles of the bed at a low magnitude of bed expansion during the decladding step found useful in our novel process.

The decladding of the element in accordance with our novel process can be carried out with pure oxygen and hydrogen fluoride or with any gaseous mixture containing oxygen and hydrogen fluoride gases which are chemically and in a quantitative proportion compatible with our system. However, the rate of decladding of the zirconium cladding increases with the purity of the oxygen and hydrogen fluoride contained in the oxidizing gas and in the preferred embodiment of our invention we use commercial grade oxygen and fluorine.

Since it is desired to recover uranium from a uranium bearing zirconium clad nuclear fuel element, all one need to do is wait until the zirconium cladding is completely decladded or sufficiently decladded so that the uranium contained therein is adequately exposed for further recovery thereof by conventional uranium recovery processes.

In the preferred embodiment of our invention the bed is fluidized by the passage of the fluidizing medium through the bed at a superficial velocity of about 0.7 ft./sec. during the decladding stage.

In the preferred embodiment of our invention after a zirconium clad uranium bearing nuclear fuel element has been decladded, so that the fissile fuel contained therein is adequately exposed so that it can be recovered, the passage of the decladding mixture through the bed is stopped and gaseous fluorine is then passed through the bed and the exposed fissile fuel in the reactor vessel is contacted with the fluorine gas by intimately contacting and fluidizing the bed particles with gaseous fluorine by passing fluorine through the bed at superficial velocity of about 0.6 ft./sec. while regulating the bed at a temperature ranging from about 400° C. to about 450° C. The passage of fluorine through the bed during this uranium recovery step is carried out until the uranium contained in the reactor vessel is converted to uranium hexafluoride which evolves from the reactor vessel is passed through filters to remove any particulate matter which may be entrained therein and is thereafter condensed and further treated by conventional means well known to those skilled in the art to recover the uranium therefrom.

Of course after the zirconium cladding has been decladded from and/or the uranium is adequately exposed by treating a zirconium clad fissile fuel bearing nuclear fuel element by means of our novel process any conventional fissile fuel recovery step or process can be employed to recover the exposed uranium. However, for the sake of economy, simplicity and ease of operation in the preferred embodiment of our invention, the exposed fissile fuel is recovered by means of passage of gaseous fluorine through the bed. It is readily apparent that not only is our process efficient but great economies are gained when it is employed to recover fissile fuel values from zirconium clad fissile fuel bearing nuclear fuel elements since it permits the re-use of a single reactor vessel and bed to recover the fissile fuel values from many nuclear fuel elements which elements can be sequentially processed in the same vessel and bed thus sharply reducing the amount of radioactive waste evolved in the reprocessing of the elements.

The size of the bed particles can vary widely since the chief limitation on the size of such particles is that they be capable of being fluidized. The bed particles of our invention can be made up of any materials which are chemically inert to the reactants utilized in our novel process. The size range of such fluidizable particles is well known to those skilled in the art and our invention is not to be construed as limited to any specific sized particles.

Construction of fluid bed reactors and the operation thereof are well known to those skilled in the art. Those skilled in the art readily realize that ratio of the amount of bed material to body to be decladded in our novel process will of course be dependent on the geometric configuration and shape of both the reactor vessel and the element to be decladded. Our invention is not to be construed as limited to any particular size or shape of reactor vessel and/or fuel element. Illustrative of the ratios of the weight of bed material to the weight of the element that have been found useable in our invention range from between about 25:1 to about 5:1. However, such a range of ratios cannot be construed as limiting the scope of our invention because it is merely representative of the range found useable by the inventors and permissable variations inherently permitted by our process will permit these ranges to be exceeded by wide margins.

The following example is given merely to illustrate the practice of our novel invention and in no way is to be construed as limiting the scope of our invention.

EXAMPLE

Apparatus

The fluidized bed reactor vessel was constructed of nickel. It had a lower section 1½ I.D., approximately 24" long. An upper section, which served as a particle de-entrainment chamber, is 3" I.D. and 12" long. The reactor is fitted with three thermocouple wells which enter through a flange at the top of the vessel. The bottom of the reactor was conical in shape and was fitted with a ball check which prevented bed material from running out of the reactor and also improved distribution of the fluidizing gas. The bottom of the cone is attached to ½" nickel tubing through which the fluidizing and reactant gases are introduced. Off-gases are exited through ½" tubing attached to the top flange of the reactor. Both the reactor and other systems components were heated by nichrome wire resistance heating circuits. The off-gas was connected to a packed bed filter of granular aluminum oxide which served to remove entrained particles from the gas stream. After passing through the filter, the off-gases were conducted in ½" line to a scrubber in which excess hydrogen fluoride was removed from the off-gas stream. Inert gases which passed through the scrubber were vented to the atmosphere.

Reagents and sample

Sample: Zirconium tubing having a wall thickness of 30 mil, ¼" O.D., 2½" in length, weighing 6.05 grams.

Fluid bed material: 1000 gms. of R.R. Alundum ($Al_2O_3$) from Norton Company, block type, 90 mesh particle size.

Nitrogen: ($N_2$) prepurified.
Oxygen: ($O_2$) dry.
Hydrogen fluoride: (HF) anhydrous.

Procedure

With the top flange of the reactor removed, 1000 gms. of bed material was fixed by means of Nichrome wire to one of the thermocouple wells attached to the top flange. The sample was positioned so that when the top flange and the reactor were re-assembled, it was ~4" above the reactor bottom and immersed in the fluidized bed. During assembly the bed was fluidized with nitrogen gas so that the gas passed up through the bed at a superficial velocity of ~0.6 ft./sec. When fluidized the bed offers no resistance to the immersion of the thermocouple sample assembly. Fluidization with $N_2$ was continued and the reactor heated to 625° C. At 625° C. the fluidizing gas mixture was converted to 40% HF and 60% $O_2$ and was passed through the bed at a rate of .75 ft./sec. This phase of the procedure was continued for 20 minutes, after which the sample was removed for examination.

Results

The reactor was disassembled and the bed and sample removed. The sample of zirconium having shown a loss in weight of 4.36 grams exhibited marked exfoliation. Large scales of what is presumed to be zirconium oxide or zirconium oxyfluoride were found adhering to the metal remaining intact as a substrate. The bed remained free flowing after reaction.

Thus it is readily apparent that our invention provides an economical, safe, easy to operate process for decladding zirconium or recovering uranium from steel clad Zircaloy clad uranium bearing nuclear fuel elements.

We claim:
1. A process for recovering uranium from zirconium clad uranium bearing nuclear fuel elements comprising:
    (a) immersing said element in a fluidized bed composed of inert granular solids;
    (b) said bed solids being fluidized by the passage of a gaseous fluidizing medium composed of from about 20 to about 90 volume percent of oxygen based on the total volume of the fluidizing medium and from about 10 to about 80 volume percent hydrogen fluoride based on the total volume of fluidizing medium while maintaining the temperature of the fluidized bed at a temperature ranging from between about 500° C. to about 800° C. until the uranium contained in said element is exposed;
    (c) fluidizing said bed and intimately contacting and reacting said exposed uranium with gaseous fluorine while maintaining the temperature of said bed at a temperature ranging from between about 400° C. to about 450° C. until the uranium in said bed is reacted with fluorine; thereafter recovering the uranium from the reaction product of uranium and fluorine gas.

2. A process for recovering uranium from a zirconium clad uranium bearing nuclear fuel element comprising:
    (a) immersing said element in a fluidized bed composed of aluminum oxide solids;
    (b) said bed solids being fluidized by the passage of a gaseous fluidizing medium composed of about 60 volume percent oxygen based on the total volume of the fluidizing medium, the remainder of the fluidizing medium being made up of hydrogen fluoride, while maintaining the temperature of the bed at about 625° C. until the uranium in said element is exposed;
(c) fluidizing said bed and intimately contacting and reacting said exposed uranium with gaseous fluorine while maintaining the temperature of said bed at a temperature ranging from about 400° C. to about 450° C. until the uranium in said bed is reacted with fluorine; thereafter recovering the uranium from the reaction product of uranium and fluorine gas.

References Cited by the Examiner

FOREIGN PATENTS 997,355  7/1965  Great Britain.

L. DeWAYNE RUTLEDGE, *Primary Examiner.*

S. TRAUB, *Assistant Examiner.*